Oct. 6, 1953          J. E. STRATMAN          2,654,494
COMBINATION HAY SWEEP AND STACKER Filed Nov. 6, 1952          7 Sheets-Sheet 1

Fig. 1.

Inventor.
John E. Stratman.

By.
Attorneys.

Patented Oct. 6, 1953

2,654,494

UNITED STATES PATENT OFFICE 2,654,494

COMBINATION HAY SWEEP AND STACKER

John E. Stratman, Holdrege, Nebr.

Application November 6, 1952, Serial No. 319,041

7 Claims. (Cl. 214—510)

This invention relates to a combination hay sweep and stacker, and more particularly to such sweep and stacker that may be detachably mounted on a tractor, truck and the like, to be propelled and operated by the power thereof.

This application is a continuation in part of my application Serial No. 21,510, filed April 16, 1948, for Combination Hay Sweep and Stacker and of my application Serial No. 113,257, filed August 31, 1949, for Hay Sweep and Stacker, both cases now abandoned.

It is a general object of this invention to provide a new and improved hay sweep and stacker which is sturdy and reliable, which may be attached to or detached from a tractor or the like with a minimum of effort and consumption of time, and which has improved mechanism for controlling discharge of hay from the sweep.

Another and more particular object of the invention is the use of stabilizer bars which form a part of a parallelogram with the boom beams for improved control over the sweep and for reduced stresses in the members particularly the sweep lifting members.

Another object is to provide a combined sweep and loader with a load pusher member slidable over the sweep tines and toggle members for moving said pusher member over said tines to remove the load from the sweep.

A further object is to provide a hay sweep designed through the incorporation of yieldable means and strategically located pivot points to allow the sweep teeth to fluctuate with the contour of the earth, thereby enabling the sweep to operate over rough terrain without danger of damage to the sweep.

Yet a further object is to furnish runners on the sweep frame and also on the forward extremities of the boom beams on which the sweep frame is attached to allow the sweep to rest on the earth with the boom beams entirely relaxed.

Other objects and advantages will become apparent from the following detailed disclosure taken in connection with the accompanying drawings, in which:

While the invention is susceptible of various modifications and alternative constructions, it is shown herein and will hereinafter be described as embodied in two forms. It is not intended, however, that the invention be limited thereby to the specific embodiments disclosed. On the contrary, it is intended to cover all modifications and alternative constructions falling within the spirit and scope of the appended claims.

Figure 1:
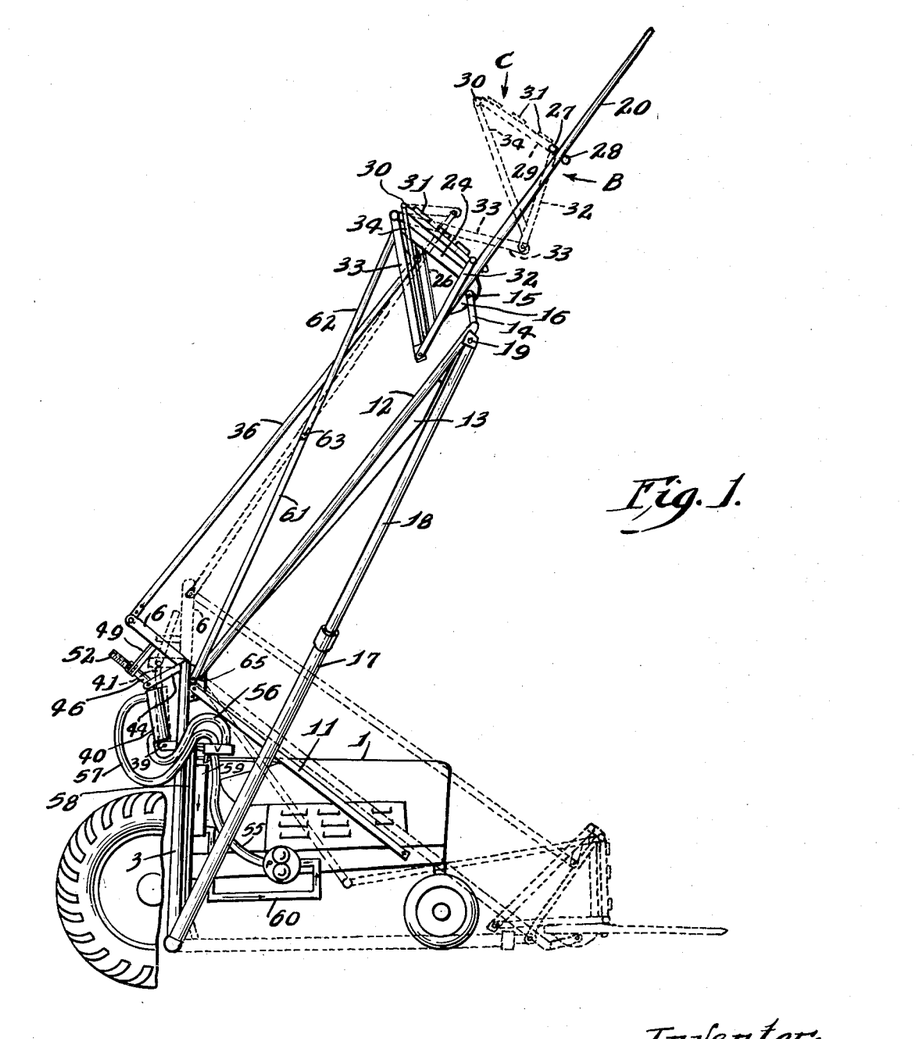
Fig. 1 is a side elevation of a hay sweep and stacker embodying my invention, and showing the same mounted on a tractor and in elevated position.

In the embodiment illustrated in Figs. 1 to 4, inclusive, the improved hay sweep and stacker is adapted to be mounted upon a farm tractor 1, or other suitable farm power vehicle, by the provision of parts for connection with mounting pads with which such tractors or vehicles are normally provided for attaching cultivators and other farm implements on the rear housing and forward portion of the chassis. As seen in Fig. 1, substantially vertical standards 3 are firmly mounted at their lower ends to the rear of the tractor (in a manner described in my said copending application), it being understood that there is a pair of these standards, one on each side of the tractor (see Fig. 3). Standards 3 are connected together at their upper ends by a rigid cross rod 4 which at its ends extends beyond standards 3 where it is formed with reduced diameters 5 to rotatably receive the respective adjacent ends of side arms 6 of a rocking frame designated generally at A for actuating the push-off mechanism, as later more fully explained.

Standards 3, at their upper ends, have each fixed thereto a pivot plate 7 having a plurality of holes 8, in the desired ones of which are inserted bolts 9 and 10. Fixed at its rear end to bolt 9 is a diagonal brace bar 11 which at its forward end is fixedly connected with the front end portion of the tractor, it being understood that there is one of these bars on each side of the tractor, see Fig. 2. A pair of boom beams 12 are positioned one on each side, each of which is pivoted at its rear end to one of said bolts 10, and each of which has fixed thereto a longitudinally extending reinforcing girder 13. Each of said boom beams at its forward end is inclined upwardly at 14, which inclined end is pivotally connected at its forward extremity at 15 to a runner 16 fixed to the rear end portion of the sweep indicated generally at B.

Pivotally mounted at the lower end portion of each of the standards 3 is a forwardly extending hoisting cylinder 17, one on each side, from which slidably extends a hydraulically operated piston rod 18 pivotally connected at its front end at 19 by a clevis, or the like, to the front end portion of the respective adjacent boom beam 12 closely adjacent its inclined end 14.

Figure 2:
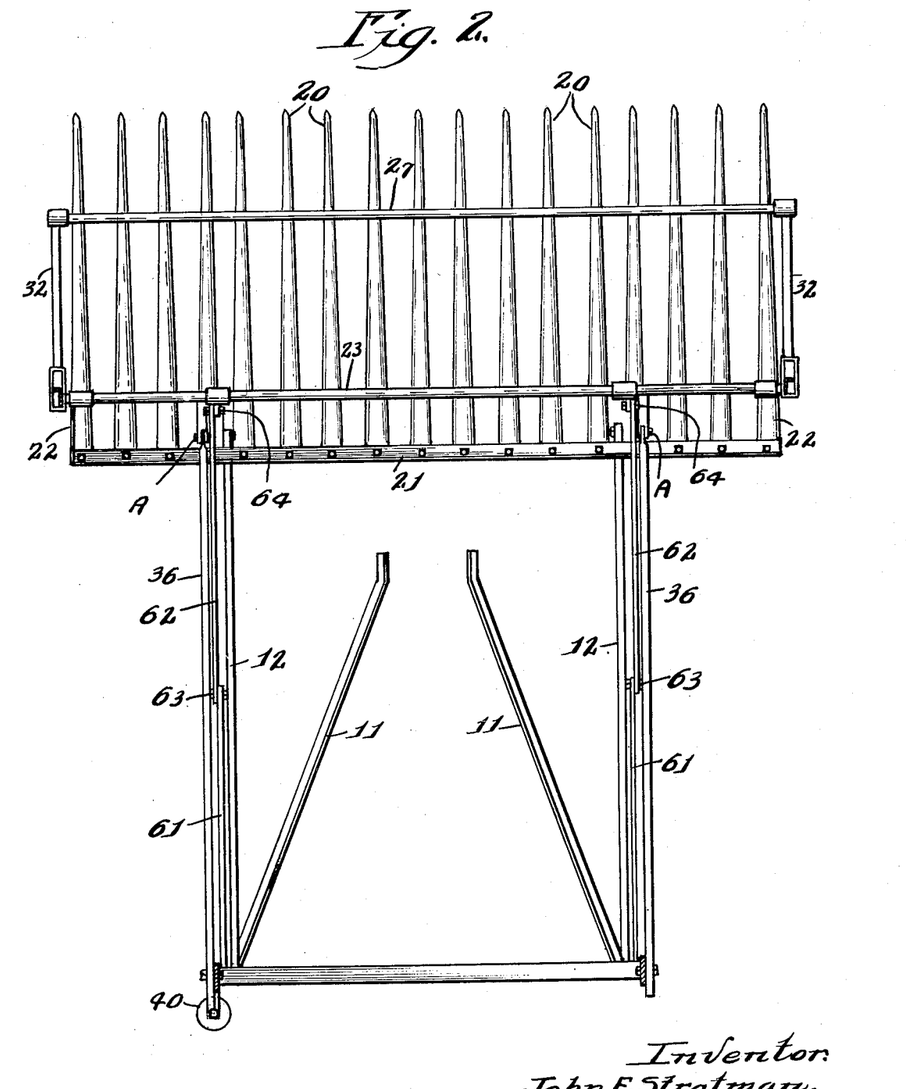
Fig. 2 is a top plan view of the hay sweep and stacker, removed from the tractor, and showing the sweep in horizontal position on the ground with the push-off rods moved partly forwardly over the tines and omitting the push-off back boards and parts of the frame thereof for clearness.
Figure 4:
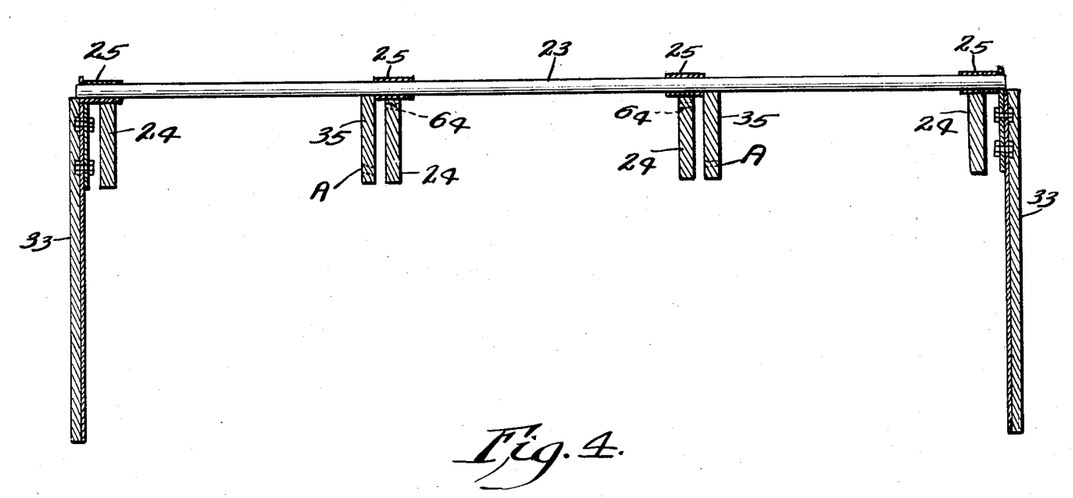
Fig. 4 is a fragmentary transverse section through the parts associated with the oscillatable shaft for actuating the push-off frame of the sweep.

As seen in Figs. 1 and 2, the sweep B comprises a plurality of tines 20, preferably tapering to a smaller front end, the thicker rear ends being rigidly connected together, in spaced relation, by a sweep back frame consisting of the rear cross bar 21 bolted to each of the tine's rear ends, end plates 22 fixed to the outer side faces of the outer tines, and a second cross bar spaced forwardly of the cross bar 21 (not visible in Fig. 2 because hidden by the oscillating shaft 23) and having upstanding fixed posts 24 having secured to their upper ends journal members 25 within which shaft 23 is oscillatable, see Fig. 4. While posts 24 are shown somewhat short in Fig. 4, it is to be understood that they may be of greater length than shown, or have lengthening pieces secured between them and the bottom portion of the sweep back frame, depending upon the height desired. Said back frame is further braced by diagonal metal braces 26 secured at their top to the upper portions of posts 24 and at their lower ends to cross bar 21, as seen in Fig. 1. This furnishes a rigid upstanding back frame for the sweep B, which parts are pivoted as a unit to the forward ends of the two boom beams 12 as described earlier herein.

Slidable longitudinally along the upper faces of the tines 20 is a cross bar 27, there also being positioned therebelow under the tines a similar cross bar 28 fixed at its ends rigidly to the ends of upper cross bar 27, so that the space between these two cross bars loosely encloses the tines as a unit for sliding movement thereover. Fixed to the upper cross bar 27 to stand upwardly therefrom and move therewith along the tines is a push-off member or frame indicated generally at C in Fig. 1, and comprising at each end an upstanding post or end bar 29 fixed together at their upper ends by a top cross bar or rod 30, and having boards 31 fixed at their ends to bars 29 at upwardly spaced intervals to extend crosswise of the tines.

Connected to each of the outer ends of cross bar 27 is a forward toggle arm 32 which at its rear end is pivotally connected to the lower end of the rear toggle arm 33, which at its upper end (see Figs. 1 and 4) is fixed to shaft 23 to oscillate therewith. Connected to each of the outer ends of the top cross bar 30 is a diagonal brace rod or bar 34 which at its rear end is fixed to forward toggle arm 32 to firmly hold the push-off frame C in position with relation to the forward toggle arm as the push-off frame is moved back and forth along the sweep tines. As will be understood there is an upstanding post or bar 29, a forward toggle arm 32, a rear toggle arm 33 and a diagonal brace rod 34 on each side of the sweep so that the two ends of the push-off frame will move together when pushing a load off of the sweep upon partial rotation of the shaft 23 in one direction. Partial rotation of shaft 23 in the opposite direction will return the push-off frame to the rear of the sweep for reception of another load when the sweep is lowered to the ground and the tines pushed under the hay or the like upon forward movement of the tractor.

The mechanism for oscillating shaft 23 will now be described. Referring to Figs. 1 and 4, there is fixed to oscillating shaft 23 a pair of spaced apart downwardly extending crank arms 35 having pivotally connected to the lower end of each the front end of one of a pair of push-off rods 36 pivotally connected at their rear ends to the upper ends of side arms 6 of the rocking frame A. Said rear ends of the push-off rods are each provided with a plurality of holes 37, the selected ones of which receive bolts 38 passing through a hole in each of the arms 6, whereby the push-off rods will be adjustable longitudinally.

Figure 3:
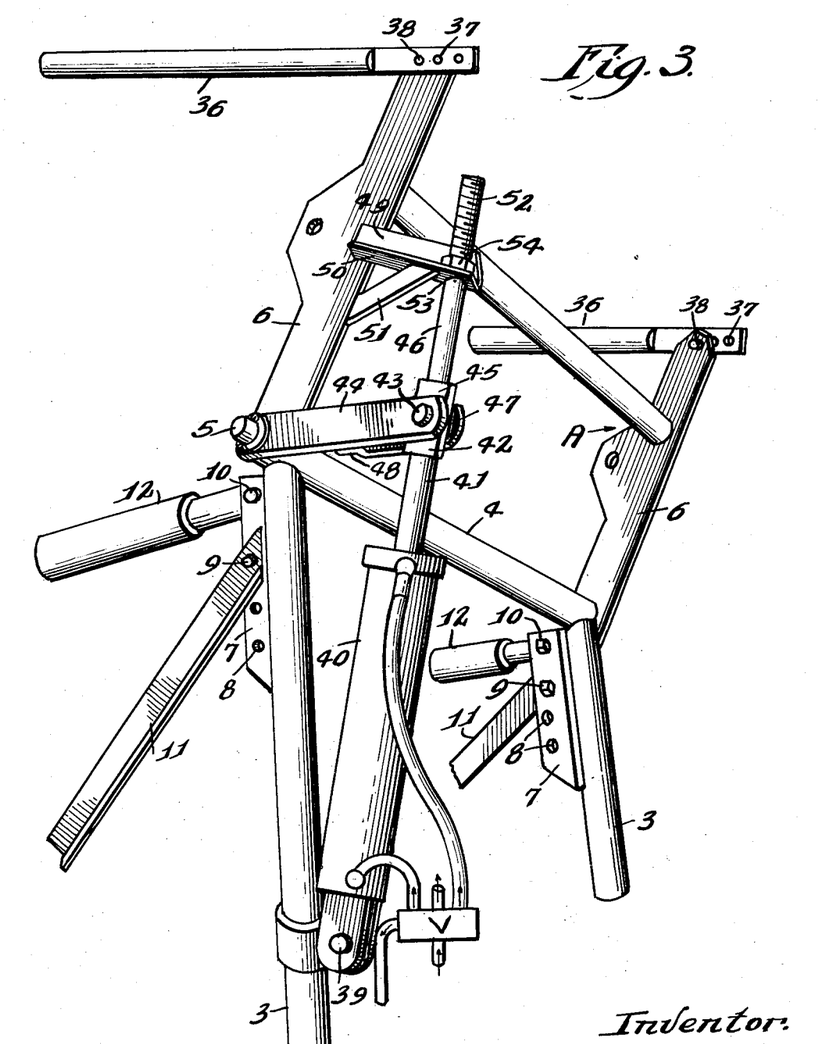
Fig. 3 is a perspective view of mechanism for moving the push-off rods longitudinally for operating the push-off frame.

Pivotally secured at 39 to one of the standards 3, as shown in Fig. 3, is a hydraulic cylinder 40 within which is slidably mounted a piston having an upwardly extending piston rod 41 passing through a suitable packing gland in the upper cylinder head. Piston rod 41 has a flattened upper end portion 42 formed with a hole, receiving bolt 43 passing through the adjacent end of a link 44 the opposite end of which link is pivotally mounted upon the adjacent protruding end 5 of cross rod 4. Also pivotally mounted on bolt 43 along one side face of flattened portion 42, is a flattened lower end portion 45 of an extension rod 46 forming a swingable extension of the piston rod 41 to enable articulation between these parts as the rocking frame A is rocked to move push-off rods 36. To provide greater stability between relatively swingable flattened portions 42 and 45, a stirrup plate 47 having a hole receiving bolt 43 is positioned on the opposite side from link 44, this plate 47 on its forward end having an offset portion 48 welded or otherwise secured to link 44. This construction provides a freely movable joint between piston rod 41 and extension rod 46.

Fixed to the side arm 6 on the piston side of rocking frame A is a rearwardly extending angle bar 49 having a bottom flange 50 to which is fixed a diagonal brace 51 fixed at its other end to the adjacent edge of side arm 6 to brace angle bar 49, as it is through these parts the power is exerted for rocking frame A and operating the push-off mechanism. Flange 50 near its outer end is formed with a hole through which extends a reduced threaded upper end 52 of the extension rod 46. A shoulder 53, somewhat larger than the reduced threaded end 52, bears upwardly against the lower face of flange 50 to exert the push of the piston rod thereagainst. Threaded onto the threaded end 52 of the extension rod 46 is a nut 54 which when tightened clamps the outer end of the flange 50 between this nut and the shoulder 53.

The tractor 1, as is usual with farm tractors, is provided with a gear pump P. In the present invention this pump P has a hose or other conduit 55 connected therefrom to a valve member V having four-way ports therein. From one of the ports of valve V extends a hose 56 connected to the lower end of the cylinder 40 below the piston therein. Leading from another of the ports in valve V is a hose, or the like, 57 leading into the top portion of the cylinder 40 above the piston therein. Leading from still another port in valve V is a hose, or the like, 58 connecting with the rear end of the sweep raising and lowering cylinder 17. As will be understood, hose 58 will be connected with another similar hose leading to the cylinder 17 on the other side of the device. When it is desired to free the oil from either end of cylinder 40 or from the rear end of cylinder 17, suitable manipulation of valve V will permit the oil to run into tank 59 from which it will be drawn as required through hose, or the like, 60 for return back to the pump P. The operation of said valve V and the various hoses leading therefrom to the various ports referred to will be further understood by reference to my said copending application Serial No. 21,510.

In Fig. 1, the hay sweep B is shown adjacent the ground in dotted lines, and in elevated position in solid lines. As will be understood, when the sweep is moving over the ground there will be no tendency of the sweep to tilt downwardly at its forward end, but at this time upward tilting of the front end of the sweep is permitted to enable it to follow the contour of the ground. When, however, the loaded sweep is elevated from the ground, it is necessary that the sweep not be permitted to tilt too far downwardly at its front end, which would prematurely dump the load on the sweep. To prevent this undue downward tilting of the sweep when the sweep is elevated from the ground, I have provided two pairs of complemental links 61 and 62 (one pair on each side of the device) these links having their adjacent ends pivoted together at 63, the front end of link 62 being pivotally connected to the upper end of the upstanding post 24 at 64, and the rear end of link 61 being pivotally connected at 65 with the upper end of the adjacent standard 3, this connection 65 being preferably with the pivot plate 7.

From the above, it will be seen that in the operation of the device the release of oil behind the hoisting cylinder 17 by suitable manipulation of valve V, and at the same time release of the oil in both ends of cylinder 40, will lower the sweep into contact with the ground, after which forward movement of the tractor will move the sweep tines along the ground, together with hay, or the like, thereon. When the sweep is loaded, valve V will be manipulated to introduce oil under pressure into both of the cylinders 17 to protrude piston rod 18 and elevate the sweep. As will be understood, during the initial part of such upward movement, the sweep will tilt slightly downwardly until the two pairs of links 61 and 62 straighten out, after which no further tilting of the sweep will occur. The sweep then continues in its upward movement to the top of the hay-stack, or other place of deposit, after which further manipulation of valve V will introduce oil below the piston in cylinder 40 and cause upward movement of piston rod 41 and piston rod extension 46, which will rock the rocking frame A in a forward direction and move the two push-off rods 36 forwardly. This results in oscillating the shaft 23 and swinging the rear toggle arm 33 in a counterclockwise direction, as viewed in Fig. 1, which will move the forward toggle member 32 forwardly and cause the push-off frame C to slide longitudinally of the tines to closely adjacent the front ends thereof and push the load off of the sweep. During this upward movement of the composite pivotally connected piston rods 41 and 46, the extension rod 46 will be swung on its pivot 43 from the position shown in solid lines to the position shown in dotted lines in Fig. 1. This upward movement of the composite piston rods will also swing link 44 upwardly, as seen in Fig. 1.

While Fig. 1 shows the sweep as elevated to an extremely high position, it is to be understood that the height of elevation of the sweep can be controlled by operation of valve V, and the pushing off of the load from the sweep can be accomplished through cylinder 40 by the manipulation of valve V at any intermediate position desired.

Figures 5, 8:
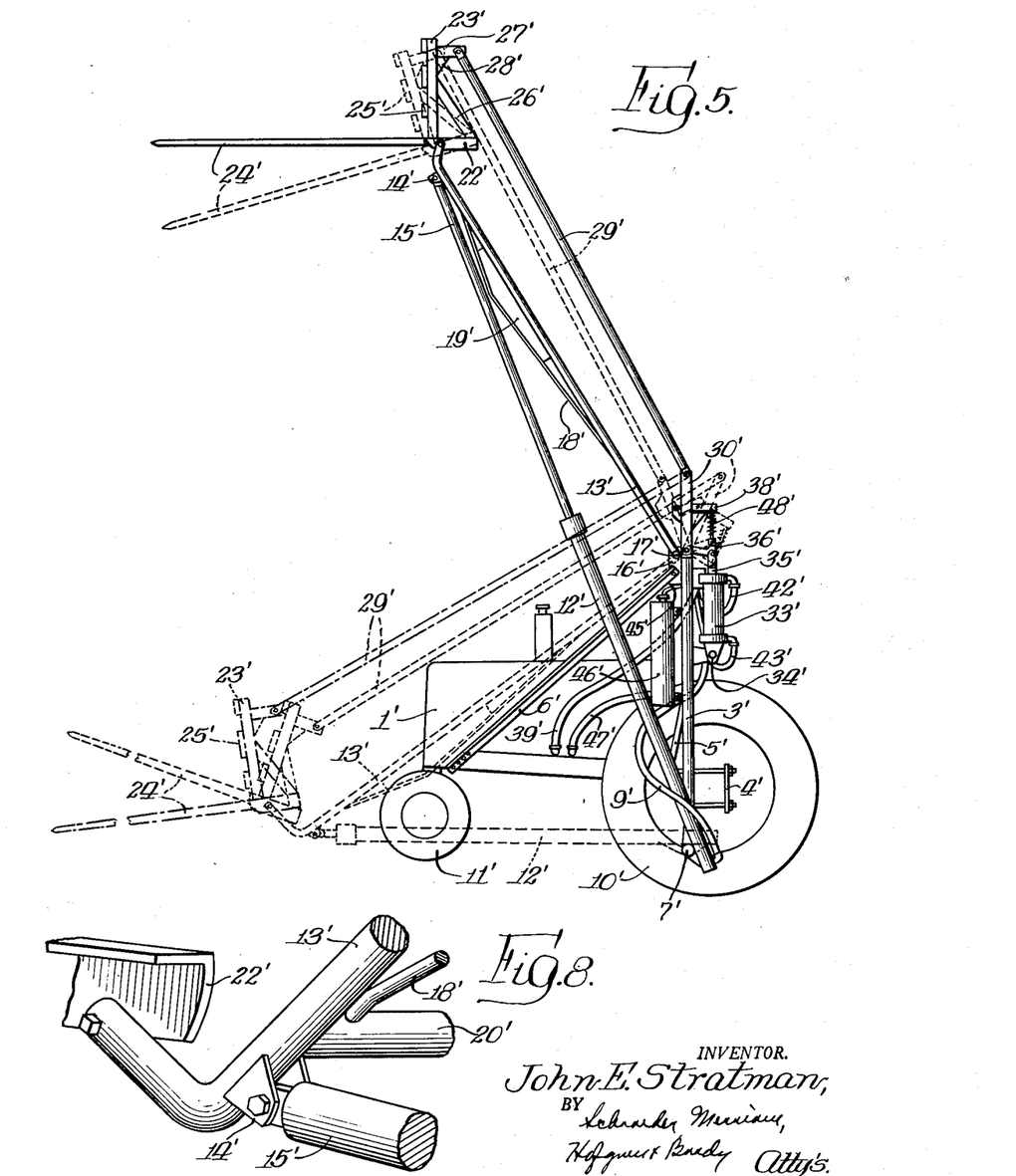
Fig. 5 is a side elevational view of a slightly modified form of combined hay sweep and stacker with the sweep in elevated position. The broken lines show the sweep in tilted position while elevated, and the extremes of its tilting movement in lowered or loading position.
Fig. 8 is a fragmentary perspective of the union of the piston rod, boom beam, boom beam support, boom girder and sweep runner.
Figures 6, 9, 10:
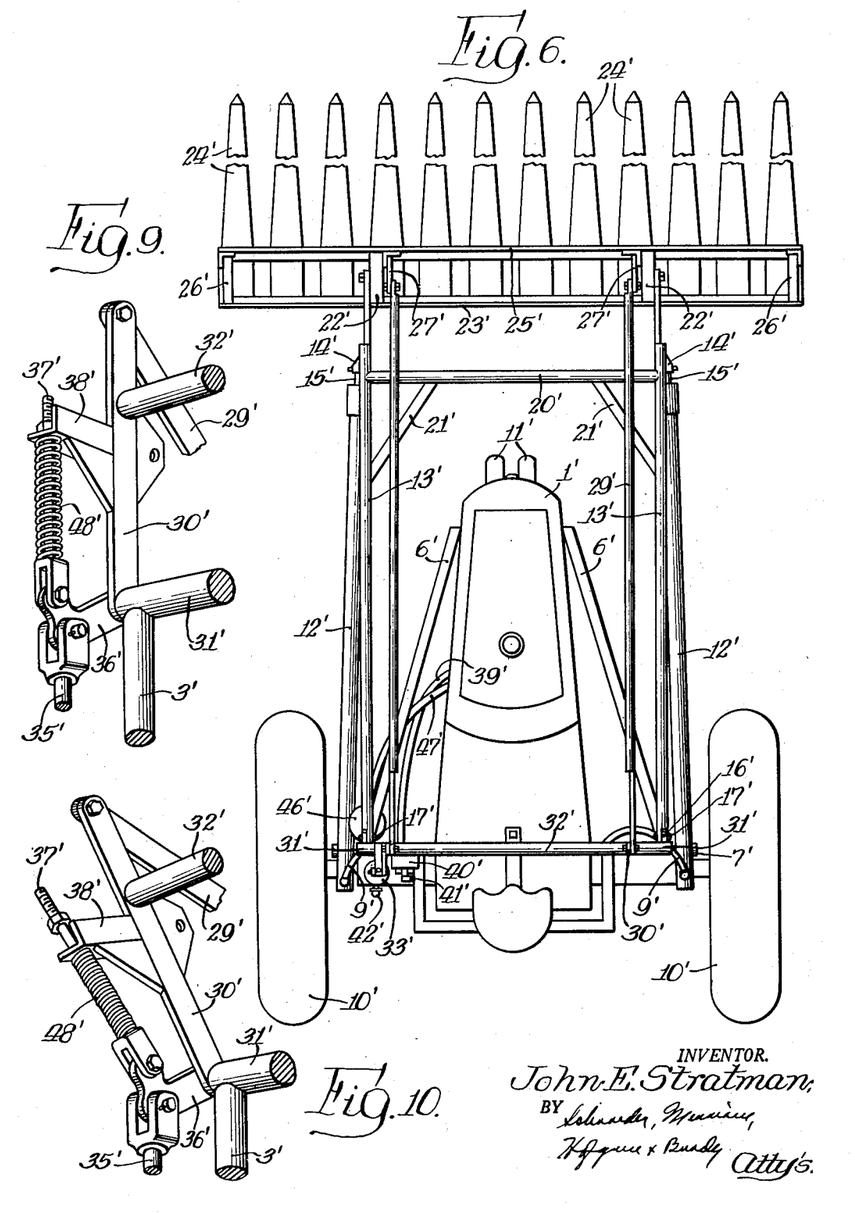
Fig. 6 is a top plan view of the sweep and stacker shown in Fig. 5.
Fig. 9 is a fragmentary perspective view of the sweep plane retainer assembly as used when the sweep teeth are on a substantially horizontal plane.
Fig. 10 is a fragmentary perspective view of the sweep plane retainer assembly as in action when the elevation of the ground raises the forward extremities of the teeth of the sweep higher than the rearward extremities of the sweep teeth, and the adjustment screw for the sweep tilt action.
Figure 7:
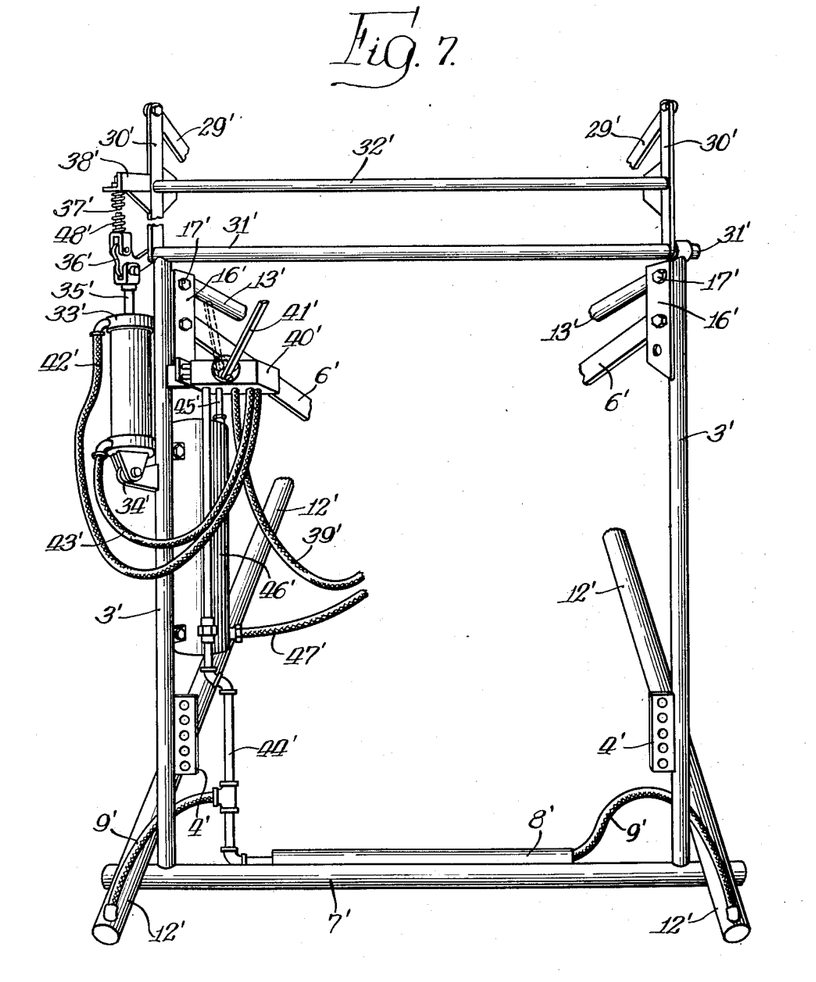
Fig. 7 is a rear elevation of the hay sweep and stacker mechanism only of Fig. 5, the sweep being in lowered position and all forwardly extending members being broken off.

In the embodiment illustrated in Figs. 5 to 10, inclusive, the combined hay sweep and stacker, while embodying all the basic principles of the form disclosed in Figs. 1 to 4, has some structural differences which give to it certain modes of operation desirable under some circumstances. The sweep and stacker is again shown as mounted on a tractor 1'. The standards 3', shown in Figs. 5 and 7, are equipped with match plates 4' which may vary in dimensions to match cultivator mounting pads on various tractors. The standards 3' are reinforced by a vertical girder brace 5' to sustain the column qualifications of the standards. Diagonal braces 6' are also installed between the upper extremities of the standards and the front cultivator mountings to further sustain the standards in a predetermined position substantially vertical.

A permanent lower support 7' extends from standard to standard and is affixed to their lower extremities to prevent transversal horizontal thrust. The hydraulic hose protector 8' is constructed as a part of the lower support to keep the cylinder hose 9' in place and to prevent damage to the hose when dismounting the invention from a tractor. Now it can be understood that the standards 3' are mounted forwardly of the rear housing of the tractor, and that the invention is attached to the tractor in four places. When the frame is detached from the tractor and lowered to the ground, the back wheels of the tractor 10' are clear and the front tractor wheels 11' may be backed over the lower support, thereby considerable time and labor is saved in detaching.

The hoisting cylinders 12' are pivotally connected to the lower extremities of the standards 3', by the extremities of the lower support 7' and extend forwardly to a pivotal connection with the boom beams 13' in a clevis 14', in which the piston rod 15' is pivotally attached.

The boom beams 13' are pivotally connected to the standards 3' on a pivot plate 16' by a pin 17' located substantially at the upper extremity of the standard 3'. The boom beams 13' extend forwardly past the union with the piston rod 15' in the form of a radius which acts as runners for the boom beams 13', which are longitudinally reinforced by a girder 18' and gusset plate 19' and transversely stabilized by a support 20' and diagonal braces 21' to eliminate the torsional stress of the two boom beams. The sweep runners 22' are pivotally connected to the forward extremities of the boom beams.

The sweep frame 23' is rigidly attached to the sweep runners 22' and accommodates the installation of sweep teeth 24' and sweep back boards 25' which are sustained by braces 26'. Terminal plates 27' are rigidly affixed at substantially the uppermost portion of the sweep frame and are reinforced by diagonal braces 28'. The terminal plates accommodate the installation of the stabilizers 29'.

The stabilizers extend from the terminal plates 27' on the sweep frame back and up to the uppermost extremity of the sweep plane arrestor lever 30' and are pivotally connected at both terminals.

The sweep plane arrestor lever 30' is pivotally connected to the uppermost extremity of the standards 3' by an axis 31' and is reinforced by a cross brace 32'. The plane of the arrestor 30' regulates the plane of the sweep teeth by the manipulation of the stabilizer bars. The plane of the arrestor is regulated by a two-way propelled hydraulic piston and cylinder assembly 33' which is pivotally connected to the standard 3' by a clevis 34'. The piston rod 35' is pivotally connected to an idler arm 36' axised on the axis 31' afforded by the arrestor 30'. An adjustment bolt 37' connects the idler arm 36' to the arm 38' rigidly affixed to the arrestor as a persuader or keeper of the plane of the arrestor.

The cylinder 33' and the piston rod 35' are manipulated by hydraulic pressure provided by the hydraulic pump of the tractor, delivered through the hose 39' from the pump to a two-position pump valve 40' provided with four-way ports. One position of the valve handle is shown as 41' in Fig. 7, the other position being shown in dotted lines. In one position the valve ports may be opened to allow hydraulic pressure through hose 42', to force the piston rod 35' downwardly thereby changing the vertical plane of the arrestor to a rearwardly oblique plane, which retracts the stabilizers 29' thereby tilting the sweep backwardly, or in the same position of the valve handle 41' by reversing the motion of the handle, the valve ports open to allow hydraulic pressure to pass through hose 43' below the piston 35' in the cylinder 33' forcing the piston rod upwardly, acting on the lever 38' to change the plane of the arrestor 30' to a forwardly oblique plane which moves the stabilizers forwardly tilting the sweep frame forwardly with sufficient pressure to tamp hay while being stacked.

With the valve handle in the position shown by dotted lines, the handle motion rearwardly affects the ports of the valve allowing the hydraulic pressure from the pump through the hose 39' to enter the pipe line 44' down to the hoses 9', which forces the piston rods 15' to elevate the booms, or if the handle 41' is placed forwardly, the hydraulic fluid is free to pass back through hoses 9', to the pipe line 44' and valve 40' to line 45' into the auxiliary supply tank 46', and from the auxiliary supply tank 46', the hydraulic fluid is free to pass back to the tractor pump by the return hose 47'.

When the position of the piston 35' is changed the hydraulic fluid forced from the cylinder 33' from the free side of the piston plunger is free to pass back to the valve 40' through the line 45' into the auxiliary supply tank 46', and through the return hose 47' to the tractor pump for reuse.

A spring action device 48' is installed on the adjustment bolt 37' between the arm 38' and the lazy arm idler 36' to accommodate the fluctuation of the sweep teeth with the contour of the earth and to prevent breakage of sweep teeth or other parts when the boom is lowered to contact a rigid surface too abruptly. Spring 48' is illustrated in Figs. 5, 9 and 10, and fragmentarily in Fig. 7.

I claim:

1. A hay sweep and stacker attachment adapted to be connected to, and operated from, a power vehicle, comprising, a pair of upright standards, a power piston assembly pivotally connected adjacent the lower end of each standard, a boom pivotally connected adjacent the upper ends of said standards, the forward ends of the power piston assemblies being pivotally connected to the front end portions of the boom, a sweep pivotally connected to the front end of the boom, an upwardly extending arm pivotally connected to one of said standards, power means on said last mentioned one of the standards connected for swinging said arm including a pressure fluid cylinder having a piston rod and an extension rod pivotally connected to the piston rod and to a link, said extension rod being attached to said arm, and said link being pivotally connected to said one standard, and a rod operable upon being moved to effect the discharge of material from the sweep, said rod being pivotally connected to the arm to be moved thereby.

2. A hay sweep and stacker adapted to be mounted on, and operated from, a power vehicle, comprising, a pair of upright standards, a sweep, a boom pivotally connected to said standards and to the sweep, a piston and cylinder device pivotally connected to said standards and to said boom for raising and lowering said sweep, a push-off frame slidably mounted on the sweep, an oscillatable shaft on said sweep, a push-off rod connected at one end to said shaft for oscillating the same, a second piston and cylinder device mounted on one of said standards, an arm swingably mounted on the last mentioned standard, means interconnecting the second piston and cylinder device and said arm for swinging the arm upon operation of the device, with said last mentioned means including an extension rod pivotally connected at one end to said piston and cylinder device and to a link, and near the other end connected to said arm and with the link being pivotally connected to said one standard whereby to increase the latitude of swinging of the arm, said push-off rod being pivotally connected to said arm to move therewith and oscillate said shaft, and pivotally connected arms connecting the shaft and push-off frame, whereby a load may be pushed off from the sweep upon operation of the second piston and cylinder device.

3. A hay sweep and stacker as claimed in claim 2 including a flexible connector connected at one end to an upstanding part fixed to the rear of the sweep, and at the other end to one of said standards, whereby to limit the amount of downward tipping of the sweep when raised from the ground, but permit a limited amount of tipping of the sweep when moving along the ground.

4. A hay sweep and stacker attachment adapted to be connected to, and operated from, a power vehicle, comprising, a pair of upright standards, a power piston assembly pivotally connected adjacent the lower end of each standard, a boom pivotally connected adjacent the upper ends of said standards, the forward ends of the power piston assemblies being pivotally connected to the front end portions of the boom, a sweep pivotally connected to the front end of the boom, a push-off frame slidably mounted on the sweep, an upwardly extending arm pivotally connected to one of said standards, power means on said last mentioned one of said standards connected for swinging said arm including a pressure fluid cylinder having a piston rod and an extension rod pivotally connected to the piston rod and to a link, said extension rod being fixed to said arm, and said link being pivotally connected to said one standard, a push-off rod pivotally connected at its rear end with the arm, and swinging connections between the front end of the push-off rod and the push-off frame for moving the push-off frame along the sweep when said arm is being moved.

5. A hay sweep and stacker comprising a rear upwardly extending frame, a sweep having forwardly projecting teeth and an upwardly extending back, a boom beam pivotally connected at its rear end with the frame and at its forward end with the rear substantially lower edge of the sweep, power means associated with said beam for raising and lowering the sweep, a lever arm pivotally connected with the top of the frame and extending upwardly beyond the frame to have swinging movement with relation thereto, a rigid elongated stabilizer bar pivotally connected at its rear end to the upper end of the lever arm and pivotally connected at its forward end to the back of the sweep near the top thereof, the stabilizer bar at all times being above the boom beam and approximately parallel therewith, and power means pivotally connected to the frame and to the lever arm so that the stabilizer bar will push forwardly on the top of the sweep back for tilting the sweep downwardly when said last mentioned power means is moved upwardly and the sweep has been raised off the ground by the first mentioned power means, said last mentioned power means including a fluid operated piston and cylinder device having a piston rod connected to the piston with the cylinder being pivotally connected with the frame and with the outer end of the piston rod being pivotally connected with a member having sliding connection with the lever arm, stop means on said member adapted to contact the lever arm and limit movement thereof outwardly of said member thereby to limit permissible downward tilting of said sweep, and a coil spring surrounding said member and bearing against the lever arm on the side thereof opposite said stop means for yieldably permitting movement of said lever arm inwardly of said member to allow said sweep to tilt upwardly.

6. A hay sweep and stacker comprising an upwardly extending rear frame, a sweep having an upwardly extending back, a boom beam pivotally connected at its rear end with the frame and at its forward end with the rear substantially lower edge of the sweep, power means associated with said boom beam for raising and lowering the sweep, an upstanding swinging lever arm pivotally mounted on the top of the frame and having a rearwardly extending rigid projection fixed thereto, a rigid bar pivotally connected at one of its ends to the upper end of said swinging arm and at the other of its ends to the back of said sweep near the top thereof, other power means for swinging said lever arm for tilting the sweep, said other power means comprising an idler arm pivotally connected to the frame, an upright piston and cylinder device having a piston rod pivotally connected at its outer end to said idler arm, a bolt pivotally connected at one end to the idler arm and at the other end being slidably mounted in said projection, a nut on the bolt adapted to contact said projection and limit sliding movement of the projection outwardly along said bolt, and a coil spring encircling said bolt for compression between said projection and a shoulder on said bolt for yieldably permitting movement of said projection inwardly along said bolt to allow said rigid bar to move rearwardly and the sweep to tilt upwardly.

7. A hay sweep and stacker adapted to be removably mounted on a farm automotive vehicle, said sweep and stacker comprising, a pair of rear upright supporting members, one on each side, a cylinder and plunger unit for each upright member, each of said units being pivotally connected at its rear end to the lower end portion of its respective upright member, a boom beam pivotally connected to the upper end portion of each of the upright members, each of said boom beams being pivotally connected at its front end portion to a front end portion of the adjacent cylinder and plunger unit, a hay sweep pivotally connected at its rear bottom portion to the front end portion of the combined boom beam and cylinder and plunger unit, a lever pivotally connected with the upper end portion of each of said upright supporting members to swingably extend thereabove, a pair of rigid stabilizer bars each pivotally connected at its forward end to the upper rear end of the sweep and pivotally connected at its rear end with the upper end of one of said levers, a fluid operable piston and cylinder device including a cylinder pivotally mounted on one of said upright supporting members, a piston in said cylinder having a piston rod projecting therefrom, a rigid rearwardly extending arm fixed to one of said levers, and means connecting said piston rod to said rearwardly extending arm including a force transmitting spring for exerting a yielding thrust on said lever in a direction to move the stabilizer bars forward to enable the sweep to tilt upwardly against the spring force a limited amount at its forward end when moving over uneven places on the ground and to yieldably urge the sweep back to normal position when said uneven place is passed, an element retaining said spring in position and including stop means for unyieldably limiting the downward tilting movement of the sweep and a link pivotally connected at one end to said one of said upright supporting members on which said piston and cylinder device is mounted and connected pivotally at the other end to said spring retaining element and said piston rod.

JOHN E. STRATMAN.

No references cited.